(12) United States Patent
Coffin et al.

(10) Patent No.: US 8,261,522 B2
(45) Date of Patent: Sep. 11, 2012

(54) REEL GANG MOWER HAVING REEL CUTTING UNITS WITH ADJUSTABLE PULL POINT LOCATIONS

(75) Inventors: Scott M. Coffin, Plymouth, MN (US); Dennis J. Berndt, Eagan, MN (US); Daniel M. Treu, Inver Grove Heights, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/878,851

(22) Filed: Sep. 9, 2010

(65) Prior Publication Data

US 2012/0060460 A1 Mar. 15, 2012

(51) Int. Cl.
*A01D 34/53* (2006.01)
(52) U.S. Cl. ............................................ 56/249; 56/294
(58) Field of Classification Search .................... 56/249, 56/294, 6, 7, 367, 372; 172/197, 445.1
See application file for complete search history.

(56) References Cited

U.S. PATENT DOCUMENTS

| | | | | |
|---|---|---|---|---|
| 2,505,879 A | * | 5/1950 | Blydenburgh | 56/15.3 |
| 4,769,976 A | * | 9/1988 | Bassett et al. | 56/7 |
| 5,193,330 A | * | 3/1993 | Nusser | 56/6 |
| 5,293,729 A | * | 3/1994 | Curry et al. | 56/7 |
| 5,533,326 A | * | 7/1996 | Goman et al. | 56/7 |
| 5,623,817 A | * | 4/1997 | Bricko et al. | 56/7 |
| 5,628,169 A | * | 5/1997 | Stiller et al. | 56/7 |
| 6,098,388 A | * | 8/2000 | Davies | 56/249 |
| 6,347,502 B1 | * | 2/2002 | deVries | 56/15.7 |

* cited by examiner

*Primary Examiner* — Arpad Fabian-Kovacs
(74) *Attorney, Agent, or Firm* — James W. Miller (57) ABSTRACT

A reel gang mower has a row of front reel cutting units and a row of rear reel cutting units that cut an unbroken swath of grass in each pass. Each cutting unit is connected for propulsion to the mower frame by a four-bar linkage having front and rear pivot links that converge towards a focal point that establishes a virtual pull point through which propulsive force acts on the cutting unit. The rear pivot links can attach to the mower frame at a selected one of different attachment points to thereby longitudinally shift the pull point fore-and-aft relative to the center of gravity of the cutting unit, thus changing the fore-and-aft weight distribution. The rear cutting units in the gang can be configured to have a tail heavy weight distribution relative to the front cutting units to help eliminate marking in the overlap areas between the cutting units.

16 Claims, 6 Drawing Sheets

REEL GANG MOWER HAVING REEL CUTTING UNITS WITH ADJUSTABLE PULL POINT LOCATIONS

TECHNICAL FIELD

This invention relates to a reel gang mower having a plurality of reel cutting units carried thereon, each of the cutting units being propelled by the frame of the gang mower through a pivot linkage that establishes a virtual pull point through which the longitudinal propulsive force received from the gang mower frame effectively acts on the cutting unit.

BACKGROUND OF THE INVENTION

U.S. Pat. No. 5,628,169 to Stiller, assigned to The Toro Company, the assignee of this invention, discloses a pivot linkage for connecting a reel cutting unit to the frame of a reel gang mower. This pivot linkage comprises a four-bar linkage on each side of the reel cutting unit between one of the side plates of the reel cutting unit and an overlying cutting unit carrier frame. The four-bar linkages on each side of the reel cutting unit are identical to one another. Basically, the four-bar linkages serve to transmit the longitudinal propulsive force from the frame of the gang mower, namely from the cutting unit carrier frame which from a propulsion standpoint can be considered to be part of the frame of the gang mower, to the cutting unit to propel the cutting unit similarly to the gang mower, namely in a forward direction when the gang mower is moving forwardly and in a rearward direction when the gang mower is moving rearwardly. Each reel cutting unit that is attached to the frame of the reel gang mower has the same pair of four-bar linkages on opposite sides thereof.

Each four-bar linkage on each side of each reel cutting unit includes a front pivot link and a rear pivot link that are longitudinally spaced apart from one another and that are contained within a common longitudinal plane adjacent to one of the side plates of the reel cutting unit. The top end of each link is pivotally secured to the cutting unit carrier frame and the bottom end of each link is pivotally secured to the adjacent side plate of the reel cutting unit. If the reel cutting unit sees a rise or dip in the ground that is not encountered by the wheels of the gang reel mower itself, the reel cutting unit can, through the provision of the front and rear pivot links within the four-bark linkage, pivot or pitch fore and aft about a horizontal transverse pitch axis independently of the gang reel mower to allow the reel cutting unit to independently follow the ground contour that it is seeing at that moment in time. Thus, the front and rear pivot links of the four-bar linkages provide a first degree of freedom of motion for the reel cutting units, namely a pivoting or pitching back and forth about a substantially horizontal pitch axis.

The front and rear pivot links of the four-bar linkages in the Stiller patent are inclined towards one another as they extend downwardly. In other words, the top ends of the links are further apart than the bottom ends such that the distance between the links progressively lessens as the links extend downwardly such that the links converge towards one another. The two links never extend far enough downwardly to actually intersect or touch one another. However, the axes of the two links when extended further downwardly below the bottom ends of the links will intersect with one another at a focal point. This focal point represents the virtual pull point of the reel cutting unit, namely the point at which the propulsive force provided by the frame of the gang mower is effectively acting on the reel cutting unit to propel the reel cutting unit. The converging axes of the front and rear pivot links allow this virtual pull point to be located very low on the reel cutting unit and close to the ground, which is desirable in avoiding the application of any overturning moments on the reel cutting unit.

The four-bar pivot linkages as described above have been used by The Toro Company, the assignee of this invention, in a gang reel mower known as the Reelmaster 3100-D. In that product, the front and rear pivot links of the four-bar linkage create a virtual pull point that is slightly below and slightly to the rear of the axis of the rotatable reel of the cutting unit, as shown in FIG. 7 of the Stiller patent. This location of the virtual pull point is approximately aligned in a longitudinal sense with the center of gravity (c.g.) of the reel cutting unit so that there is little or no torque about the pull point tending to rotate the reel cutting unit in one direction or the other about the pull point when the cutting unit is up off the ground in a transport position. One can think of this as a neutral or balanced position in which the weight of the cutting unit is substantially, though not necessarily exactly, equally located on either side of the virtual pull point. Thus, when the cutting unit is down on the ground and is cutting grass, it has a generally neutral fore-and-aft weight distribution with approximately as much weight being seen by the front roller as the rear roller of the reel cutting unit. In this respect, it should be noted that this substantially neutral or balanced position can be one in which there is a very slight weight bias to the rear, i.e. the c.g. is just slightly behind the virtual pull point so that the reel cutting unit approaches the ground when it is being lowered towards the ground by the lift arm in a slight tail down orientation in which the rear roller is slightly lower than the front roller so that the rear roller hits the ground first.

The four-bar pivot linkages of the Stiller patent were an advance in the mowing art in allowing the creation of virtual pull points that were low on each reel cutting unit and that were substantially longitudinally aligned with the c.g. of the reel cutting unit. However, the Applicants have discovered that the provision of just one pull point is too limiting due to variations in grass conditions and an increasing desire in the art for improved after cut appearance from gang mowers. In certain grass conditions, the front and rear cutting units of a reel gang mower can leave marks in the cut grass swath where the rear cutting units overlap the front cutting units with the grass being rolled and cut twice in the overlap areas. Such streaks are objectionable where the appearance of the cut grass swath is important to the end user, e.g. on golf courses that host professional golf tournaments, other highly manicured golf courses, and the like. These users desire a cut grass swath that is as uniform in appearance from one side to the other as is possible, even though portions of the swath are actually acted on by the cutting units twice in the overlap areas whereas other portions of the swath are only acted on by the cutting units once in the non-overlap areas.

The Applicants have discovered that the aftercut appearance issues noted above can be solved by providing the user with the ability to adjust the pull points on the reel cutting units to be able to selectively change the fore and aft weight balance of the cutting unit. Accordingly, it would be a further improvement in the art if reel cutting units were provided which enable the user to easily pick and choose different pull point locations.

SUMMARY OF THE INVENTION

One aspect of this invention relates to an improved reel gang mower having a frame. A plurality of reel cutting units is carried on the frame in a gang configuration. Each of the reel cutting units comprises a rotatable reel, a bedknife and front and rear rollers for supporting the reel cutting unit for rolling on the ground. A linkage connects each reel cutting unit for propulsion to the frame with the linkage establishing a pull point through which propulsive force from the frame is transmitted to the reel cutting unit for propelling the reel cutting unit. The improvement comprises a plurality of alternatively usable and different pull point locations for at least one of the reel cutting units which are at different fore-and-aft locations relative to a center of gravity of the reel cutting unit such that different fore-and-aft weight distributions are provided at different fore-and-aft pull point locations. Consequently, the relative amounts of weight seen by the front and rear rollers in the different pull point locations change depending upon which pull point location is used. A user can select a desired pull point location for each of the reel cutting units to provide a desired fore-and-aft weight distribution on each reel cutting unit to achieve different cutting results in different grass conditions.

Another aspect of this invention relates to an improved reel gang mower of the type having a plurality of laterally spaced front reel cutting units having lateral gaps therebetween. Each gap is covered by a rear reel cutting unit that spans the gap and that extends beyond opposite sides of a pair of adjacent front cutting units to also overlap by an overlap distance portions of the spaced front cutting units such that all the front and rear cutting units collectively cut an unbroken swath of grass during a single pass of the mower. Each of the front and rear reel cutting units have front and rear rollers engaging the ground for independently supporting each reel cutting unit for rolling on the ground as the reel cutting units are cutting grass. The improvement comprises a first pivot linkage that connects the front reel cutting units to a frame of the reel gang mower for propelling the front reel cutting units in a forward and rearward direction as the frame of the reel gang mower moves forwardly and rearwardly. The first pivot linkage provides a first pull point on the front cutting units that establishes a first fore-and-aft weight distribution in which the front and rear rollers see predetermined amounts of weight as the front reel cutting units are cutting grass. A second pivot linkage connects the rear reel cutting units to the frame of the reel gang mower for propelling the rear reel cutting units in a forward and rearward direction as the frame of the reel gang mower moves forwardly and rearwardly. The second pivot linkage provides a second pull point on the rear cutting units that establishes a second fore-and-aft weight distribution in which the front roller sees less weight and the rear roller sees more weight than they do in the front reel cutting units as the rear reel cutting units are cutting grass. The lighter front roller weight on the rear reel cutting units helps eliminate or minimize marking in the overlap areas between the front and rear reel cutting units.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

FIGS. 1-6 depict one embodiment of a reel cutting unit according to this invention generally as 2. Cutting unit 2 is very similar to cutting unit 2 disclosed in U.S. Pat. No. 5,628,169, owned by The Toro Company, the assignee of this invention, and the '169 patent is hereby incorporated by reference for teaching various details of cutting unit 2 and the gang mower (not shown herein) with which cutting unit 2 may be used. A plurality of cutting units 2 may be placed in a gang configuration on the gang mower disclosed in the '169 patent or on other known reel gang mowers, including Toro's Reelmaster 3100-D.

By way of overview, cutting unit 2 comprises a pair of laterally spaced apart side plates 4 that may be joined by various other members, such as a top wall 6 or a back wall (not shown). A rotatable reel 8 having a plurality of helical blades is rotatably journalled between side plates 4 of cutting unit 2. A bedknife 10 is placed beneath a lower portion of the orbit of reel 8 such that the blades of reel 8 will sweep grass against a sharpened cutting edge of bedknife 10 for cutting the grass using a shearing action. Front and rear ground engaging rollers 12 and 14 extend between side plates 4 for allowing cutting unit 2 to roll independently on the ground during forward motion of the gang mower (not shown) to which cutting unit 2 is attached. The structure of cutting unit 2 as described thus far is conventional and corresponds to that disclosed in the '169 patent.

A cutting unit carrier frame 16 overlies cutting unit 2 and for the purposes of longitudinal propulsion is, in effect, part of the frame of the gang mower. In other words, carrier frame 16 is moved forwardly or rearwardly as the frame of the gang mower moves forwardly or rearwardly. Carrier frame 16 includes a hollow roll sleeve 18 for mounting on one of the lift arms of the gang mower to allow carrier frame 16 and cutting unit 2 to roll together about a longitudinal roll axis. However, for the purposes of this invention, this rolling action is not important and could be dispensed with if so desired, in which case roll sleeve 18 would be absent and carrier frame 16 could be coupled in a non-rolling fashion to the lift arm. Again, this type of carrier frame 16 with a roll sleeve 18 is conventional and corresponds to that disclosed in the '169 patent.

Figure 1:
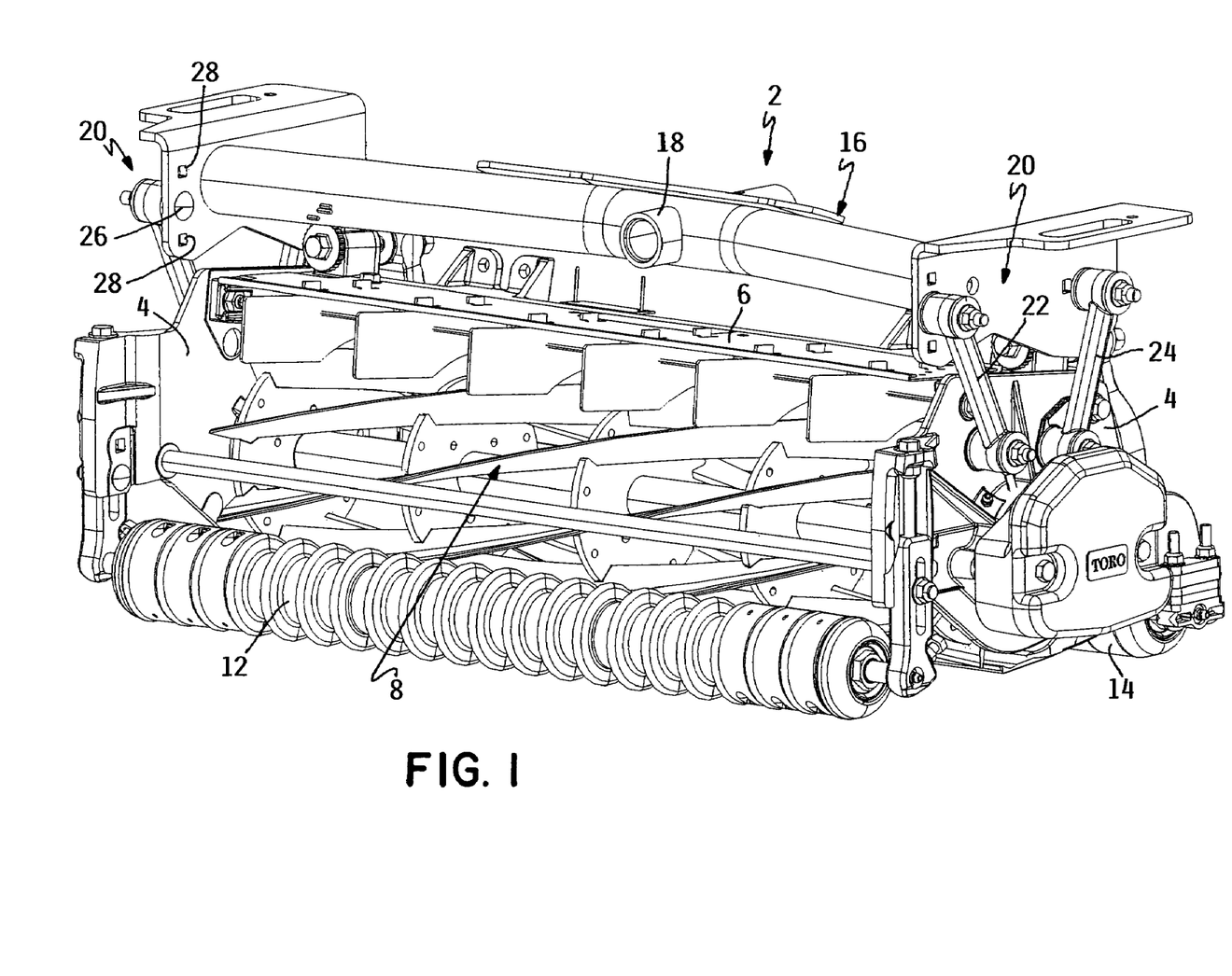
FIG. 1 is a perspective view of a reel cutting unit according to this invention, the reel cutting unit being one of a plurality of generally identical units that can be installed on a reel gang mower.
Figure 2:
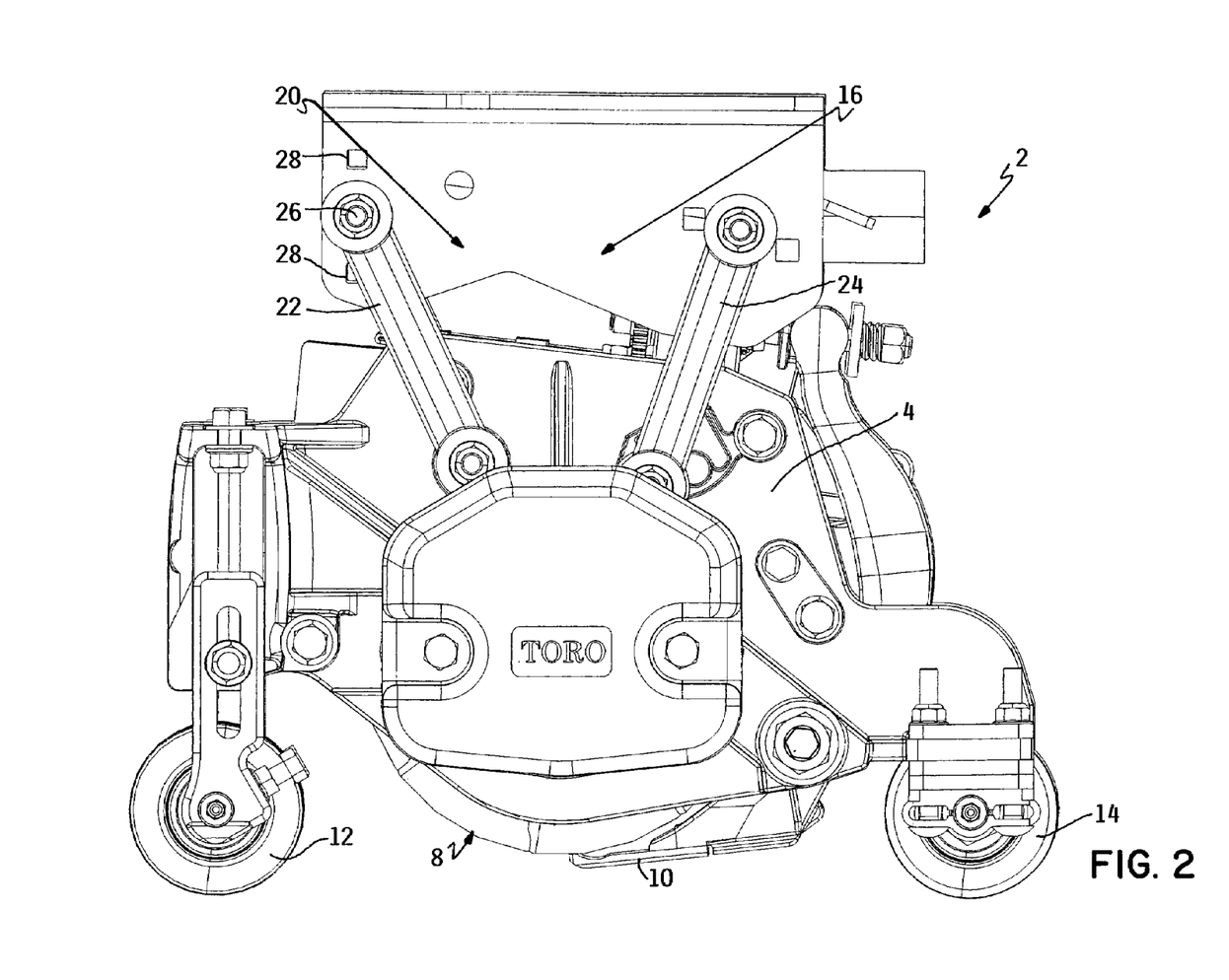
FIG. 2 is a side elevational view of the reel cutting unit of FIG. 1.

A four-bar linkage 20 that includes front and rear pivot links 22 and 24 is used to couple each side plate 4 on cutting unit 2 to one side of carrier frame 16. As shown in FIGS. 1 and 2, pivot links 22 and 24 of each four-bar linkage 20 are pivotally coupled at their upper ends to carrier frame 16 and at their bottom ends to the adjacent side plate 4 of cutting unit 2. Pivot links 22 and 24 converge towards one another as they extend downwardly. Once again, this type of four-bar linkage 20 including the converging front and rear pivot links 22 and 24 is conventional and corresponds to that disclosed in the '169 patent.

In cutting unit 2 of this invention, front pivot link 22 attaches to the side of carrier frame 16 at a single pivot location as show at 26 in FIGS. 1-6. There are two holes 28 shown in the side of carrier frame 16 above and below the single pivot location 26 of front pivot link 22 implying that front pivot link 22 could be repositioned on carrier frame 16, but this is not the case. The additional holes 28 that are shown are not the right size for receiving the pivot pin or bolt that secures the upper end of front pivot link 22 and are used for attaching a grass catcher (not shown) to cutting unit 2. Thus, the reader hereof should ignore the two holes 28 shown above and below the single pivot location 26 of front pivot link 22 as these holes 28 form no part of this invention. Insofar as cutting unit 2 of this invention shows a single pivot location 26 for front pivot link 22 on carrier frame 16, this is also conventional and corresponds to that disclosed in the '169 patent.

However, unlike the cutting unit disclosed in the '169 patent, cutting unit 2 of this invention includes a plurality of holes 30 to which the upper end of rear pivot link 24 can be pivotally attached. All holes 30 are sized to receive the pivot pin or bolt on the upper end of rear pivot link 24 and rear pivot link 24 can be interchangeably and alternatively coupled to any one of the holes 30. Holes 30 are arranged on side plate 4 such that holes 30 are longitudinally spaced apart by approximately 1 inch from one another, the holes 30 being disposed in an arc that is at a constant distance or radius from the pivot axis of the lower end of rear pivot link 24. Thus, there is a front hole 30f, a middle hole 30m, and a rear hole 30r with front hole 30f being higher than middle hole 30m and middle hole 30m being higher than rear hole 30r.

Figure 3:
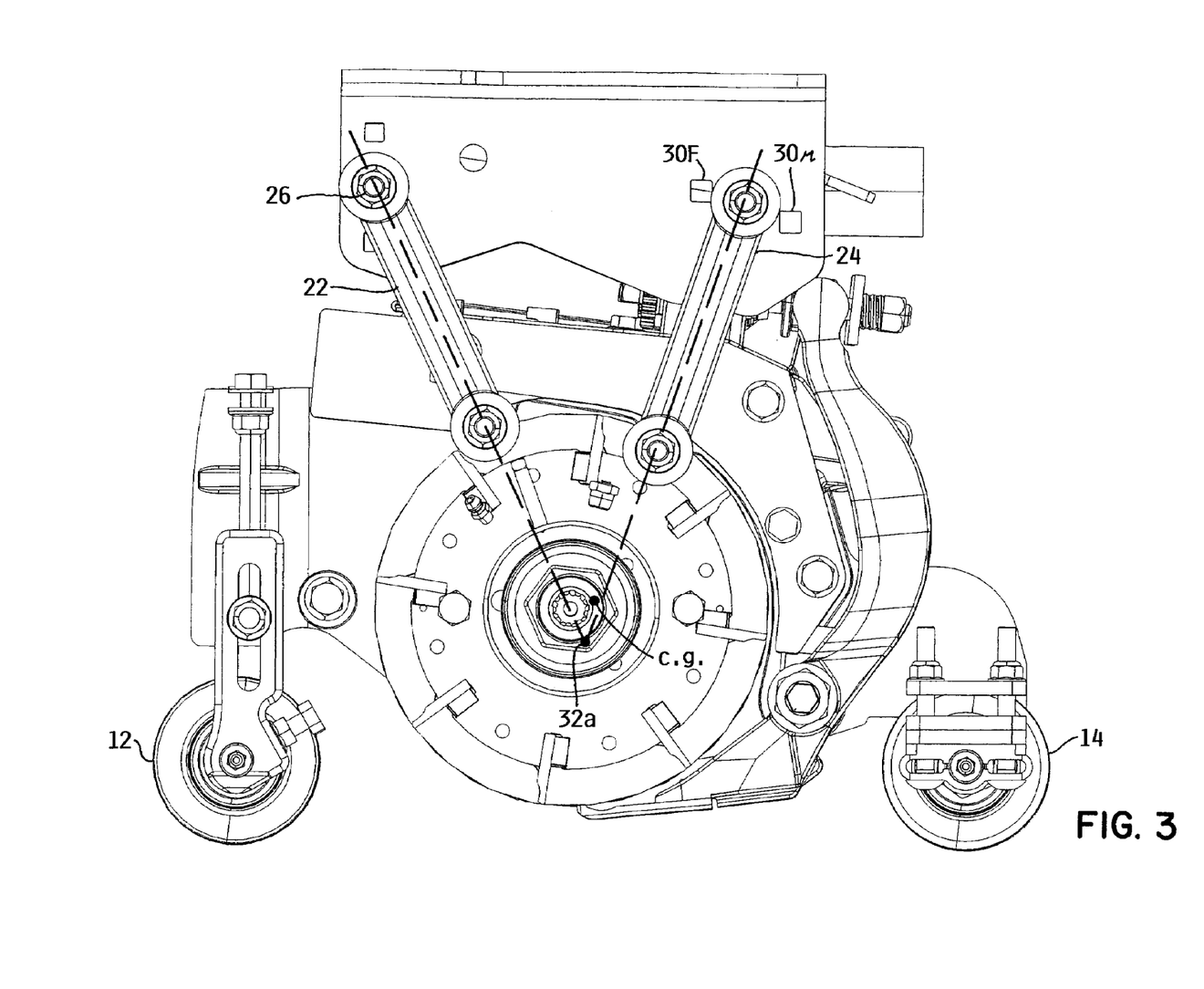
FIG. 3 is a side elevational view similar to FIG. 2 but with the near side plate of the reel cutting unit having been removed to show the orientation of the front and rear pivot links of the four-bar linkage relative to the center of the rotatable reel, particularly illustrating the rear pivot link in a first position that provides a nominal or usual virtual pull point for the reel cutting unit which establishes a generally neutral fore-and-aft weight distribution.

Referring now to FIG. 3, when the upper end of rear pivot link 24 is coupled to middle hole 30m, pivot links 22 and 24 converge at a focal point that establishes a first virtual pull point 32a for cutting unit 2. The propulsive forces that are transmitted from carrier frame 16 to cutting unit 2 act on cutting unit 2 as if they were being directly applied to cutting unit 2 at pull point 32a. As seen in FIG. 3, pull point 32a is located slightly below and slightly rearwardly of the centerline of reel 8. The location of pull point 32a is substantially longitudinally aligned with the center of gravity (c.g.) of cutting unit 2. Thus, there is no moment arm tending to cause cutting unit 2 to tip or pivot about the pull point (or there is only a very small moment arm tending to tip or pivot cutting unit 2 slightly towards rear roller 24), such that pull point 32a establishes a generally neutral or balanced fore-and-aft weight distribution on cutting unit 2. There is approximately as much weight on front roller 22 as on rear roller 24. Pull point 32a is the pull point which would probably be used most often on cutting unit 2.

Figure 4:
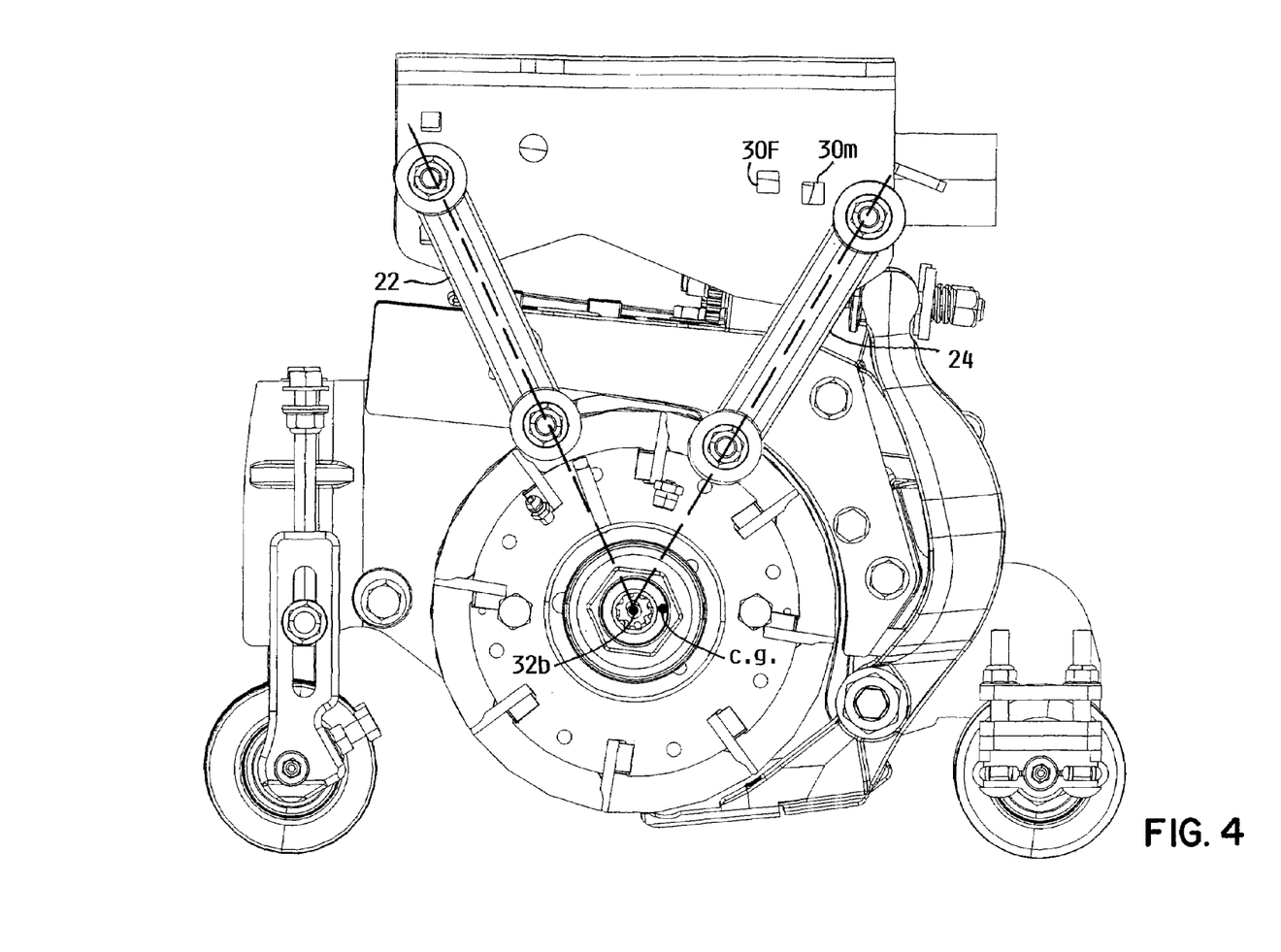
FIG. 4 is a side elevational view similar to FIG. 3, particularly illustrating the rear pivot link in a second rearward position relative to the first position that provides a second virtual pull point for the reel cutting unit which establishes a tail heavy fore-and-aft weight distribution.

However, with the addition of the front and rear holes 30f and 30r for rear pivot link 24, the user has the option of connecting the upper end of rear pivot link 24 to one of these other holes. If the user selects rear hole 30r as shown in FIG. 4, a second virtual pull point 32b is established that is shifted upwardly and forwardly from pull point 32a. Since the location of the c.g. is still the same, the longer moment arm established by this shift in pull point 32b creates a tail heavy fore-and-aft weight distribution that shifts more weight to rear roller 24 as compared to front roller 22. With less weight now on front roller 22, the aggressiveness of cutting unit 2 in cutting grass is lessened. In some grass conditions, as explained hereafter, this is desirable.

Figure 5:
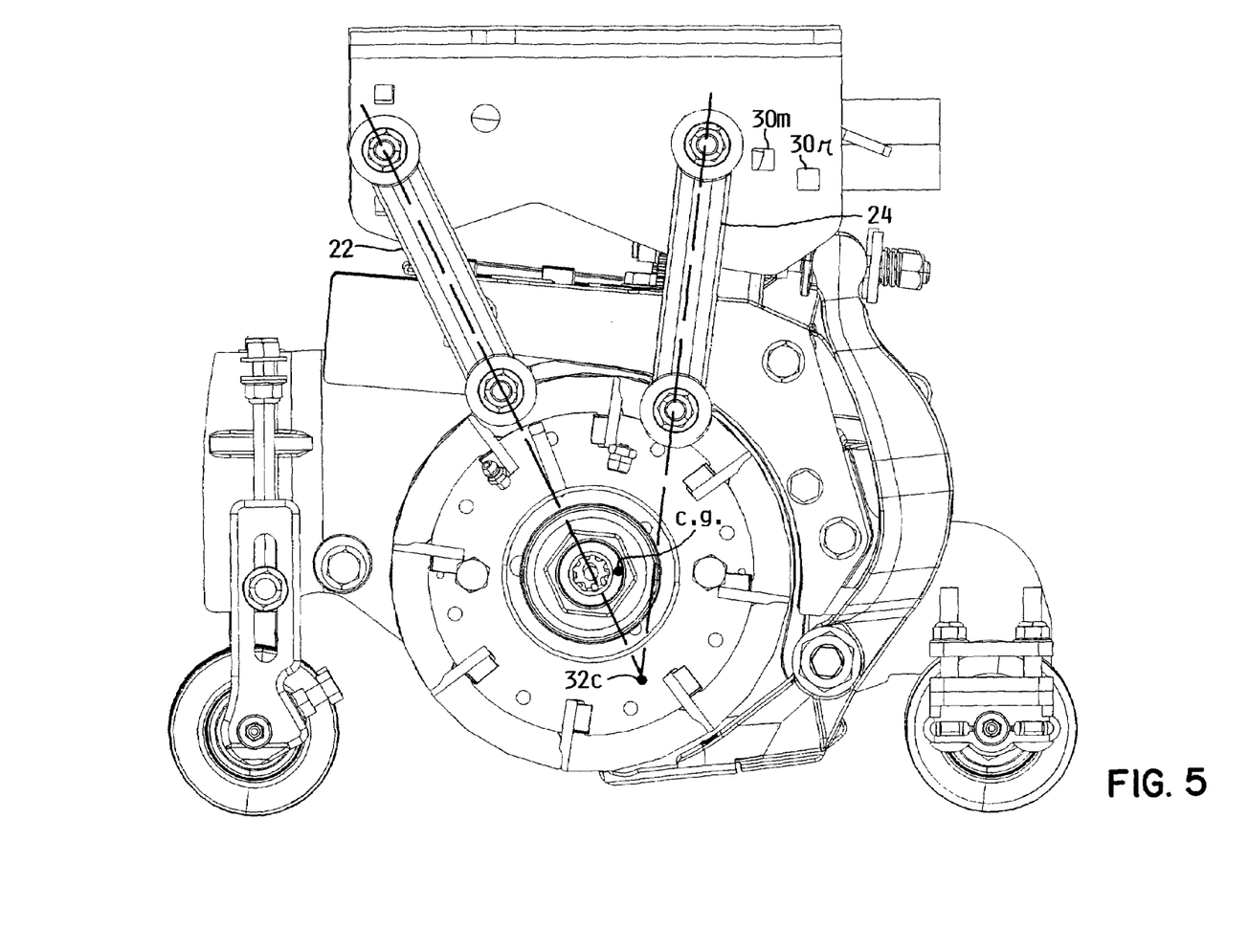
FIG. 5 is a side elevational view similar to FIGS. 3 and 4, particularly illustrating the rear pivot link in a third forward position relative to the first position that provides a third virtual pull point for the reel cutting unit which establishes a nose heavy fore-and-aft weight distribution.

Similarly, by referring to FIG. 5, one can see that use of front hole 30f establishes a third virtual pull point 32c that is moved downwardly and rearwardly from pull point 32a. In fact, pull point 32c preferably moves in back of, at least slightly, the c.g. of cutting unit 2. This creates a nose heavy fore-and-aft weight distribution in which more weight is placed on front roller 22 as compared to rear roller 24. This increases the aggressiveness of cutting unit 2 in cutting grass, which can be desirable in other grass conditions. As a result, user can easily and quickly vary the aggressiveness of cut by moving the upper end of rear pivot link 24 from one hole 30 to another, a more aggressive cut being provided by front hole 30f, a cut of normal aggressiveness being provided by middle hole 30m, and a cut a lessened aggressiveness being provided by rear hole 30r.

Figure 6:
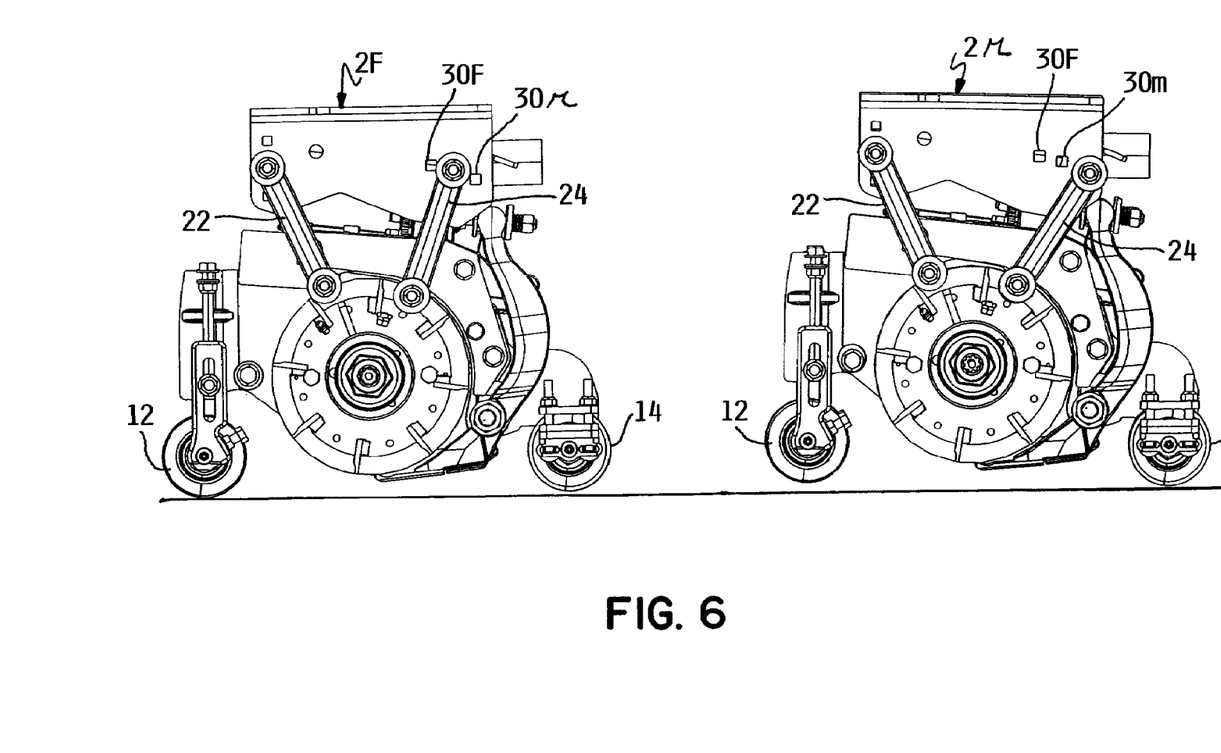
FIG. 6 is a side elevational view of the front and rear cutting units in a reel gang mower, particularly illustrating the use of different pull points on the rear cutting units compared to the pull points on the front cutting units for improving aftercut appearance in some grass conditions.

One way a user can use this feature is to configure the front and rear cutting units 2f and 2r of a reel gang mower differently as shown in FIG. 6. In this depiction, rear pivot links 24 of front cutting units 2f are coupled to middle hole 30m to provide a cut of normal aggressiveness. However, if certain grass conditions are present, trailing cutting units 2r will leave marks due to double cutting in those portions of the cut grass swath in which trailing cutting units 2r overlap the sides of front cutting units 2f. If this occurs, the Applicants have found that configuring rear cutting units 2r differently from front cutting units 2f can effectively solve or mitigate this problem, namely by using rear holes 30r to provide a less aggressive cut on rear cutting units 2r. The less aggressive cut is visually suggested in FIG. 6 by showing front roller 22 of rear cutting units 2r up slightly off the ground. This is an exaggeration since front roller 22 would be in contact with the ground when cutting grass, but the exaggeration is simply meant to be a visual indicator that there is less weight on front rollers 22 of rear cutting units 2r than there is on front rollers 22 of front cutting units due to the use of the rearward hole location 30r on rear cutting units 2r as opposed to the use of middle hole location 30m on front cutting units 2f.

Thus, this invention and the versatility in the aggressiveness of cut that is provided by multiple holes 30 for rear pivot link 24 can enhance the aftercut appearance of the cut grass swath, which is obviously desirable to some users of reel gang mowers. However, the example of how this might be done set forth in the preceding paragraph is not meant to be limiting. Other combinations of different holes 30 might be used at the same time on the front and rear reel cutting units 2f and 2r in different grass conditions. It would also be the case that the same holes 30 might be used on all cutting units 2 of a given reel gang mower, i.e. both the front and rear reel cutting units 2f and 2r are using middle holes 30m at one time in one set of grass conditions, or front holes 30f at another time in a second set of grass conditions, or rear holes 30r at a third time in a third set of grass conditions.

In some cases, a rear roller brush attachment (not shown) is installed atop rear roller 24 of cutting unit 2 to help keep rear roller 24 free of grass clippings or other debris. This has some impact on the location of the c.g. and shifts the c.g. further rearwardly. Thus, the supposedly neutral fore-and-aft weight distribution of cutting unit 2 using pull point 32a is changed into a slightly more tail heavy weight distribution which, in some grass conditions, might not be desired. Thus, with a rear roller brush attachment in place, shifting the upper end of rear pivot link 24 to front hole 30f can help compensate for the added weight of rear roller 24 brush attachment and helps maintain a generally neutral fore-and-aft weight distribution.

The various adjustments holes 30 that are used to adjust the pull point locations have been shown in connection with the upper end of rear pivot link 24, but this need not necessarily be the case. The virtual pull point location could have been varied by placing the series of adjustment holes 30 on the side plate of reel cutting unit 2 rather than on carrier frame 16, or adjustment holes 30 could have been used in connection with the upper or lower ends of front pivot link 22.

Moreover, adjustment holes 30 could be used in different pivot linkages in which actual pull points, rather than virtual pull points, are used. For example, such a pivot linkage might include one where a single pivot link or arm transfers propulsive force from the gang mower frame to the reel cutting unit. Such a single pivot link would be connected at one end by a pivot connection to the gang mower frame and at the other end by a pivot connection to the reel cutting unit. In this case, the pull point is located at the actual location at which the other end of the pivot link connects to the reel cutting unit. In this case, the reel cutting unit might have a plurality of adjustment holes thereon for receiving the other end of the pivot link for varying where the pivot link actually connects to the reel cutting unit. Thus, this invention is applicable whether actual or virtual pull points are employed in transferring propulsive force from the gang mower frame to the reel cutting unit.

Various other modifications of this invention will be apparent to those skilled in the art. For example, and not by way of limitation, rather than use a set of discrete adjustment holes 30 on carrier frame 16, the upper end of rear pivot link 24 could be shifted in an infinite manner if it were connected to carrier frame 16 by some type of threaded adjuster that could be rotated to move the upper end of rear pivot link 24 in a fore-and-aft direction. Accordingly, the scope of this invention will be limited only by the appended claims.

The invention claimed is:

1. An improved reel gang mower having a frame, a plurality of reel cutting units carried on the frame in a gang configuration, each of the reel cutting units comprising a rotatable reel, a bedknife and front and rear rollers for supporting the reel cutting unit for rolling on the ground, a linkage for each reel cutting unit comprising at least one pivot link having a first pivot connection between the at least one pivot link and the reel cutting unit and a second pivot connection between the at least one pivot link and the frame with the linkage establishing a pull point through which propulsive force from the frame is transmitted to the reel cutting unit for propelling the reel cutting unit, wherein the improvement comprises:
at least one connection point of the linkage for at least one reel cutting unit being selectively movable by a user in a fore-and-aft direction to provide a plurality of alternatively usable and different pull point locations for the at least one reel cutting unit which pull point locations are at different fore-and-aft locations relative to a center of gravity of the at least one reel cutting unit such that different fore-and-aft weight distributions between the front and rear rollers of the at least one reel cutting unit are provided, whereby the user selectively moves the at least one connection point to change or adjust the fore-and-aft weight distribution on the at least one reel cutting unit to achieve different cutting results in different grass conditions.

2. The gang mower of claim 1, wherein there are at least two pull point locations comprising:
(a) a first pull point located relative to the center of gravity such that a first substantially balanced fore-and-aft weight distribution is provided; and
(b) a second pull point located further forwardly relative to the center of gravity than the first pull point such that a tail heavy fore-and-aft weight distribution is provided in which the front roller sees less weight and the rear roller sees more weight than the amounts of weight they see when the first pull point is used when the cutting unit is cutting grass and the front and rear rollers are in contact with the ground.

3. The gang mower of claim 2, wherein the reel cutting units are disposed in a gang configuration comprising a row of front cutting units and at least one staggered rear cutting unit with the rear cutting unit(s) covering gaps between the front cutting units and with the rear cutting unit(s) being overlapped in areas with the front cutting units such that the front and rear cutting units collectively cut an unbroken swath of grass, and wherein the at least one reel cutting unit comprises the rear cutting unit(s) with the at least one connection points in the linkages of the rear cutting unit(s) having been moved by the user to use the second pull point in each of the rear cutting unit(s) to improve the aftercut appearance of the cut grass swath when cutting grass in grass conditions in which marks would otherwise be left in the overlap areas between the front and rear cutting units.

4. The gang mower of claim 2, further including at least a third pull point location located further rearwardly relative to the center of gravity than the first pull point and at least slightly behind the center of gravity such that a nose heavy fore-and-aft weight distribution is provided in which the front roller sees more weight and the rear roller sees less weight than the amounts of weight they see when the first pull point is used when the cutting unit is cutting grass and the front and rear rollers are in contact with the ground.

5. The gang mower of claim 4, wherein the propulsive force is provided on the at least one reel cutting unit by a pair of longitudinally spaced, front and rear pivot links that comprise the linkage, wherein the front and rear pivot links converge towards one another as the pivot links extend downwardly from the frame of the gang mower to the at least one reel cutting unit, and wherein the first, second and third pull points are virtual pull points formed by the intersection of axes along which the front and rear pivot links extend.

6. The gang mower of claim 5, wherein one end of at least one of the pivot links comprises the movable connection point of the linkage and connects to either the frame of the gang mower or the at least one reel cutting unit in one of a plurality of longitudinally spaced attachment holes to change the fore-and-aft location of the intersection of the pivot link axes to thereby provide the different pull point locations, the pull point locations changing depending on which attachment hole is used.

7. The gang mower of claim 6, wherein a top end of the rear pivot link attaches to the frame of the gang mower in one of the plurality of attachment holes to change the pull point locations.

8. The gang mower of claim 1, wherein the alternatively usable pull point locations are a plurality of discretely different pull point locations.

9. The gang mower of claim 8, wherein the discretely different pull point locations are provided by a plurality of fore-and-aft spaced holes provided on either the frame of the gang mower or on the at least one reel cutting unit, and wherein one end of the at least one pivot link comprises the movable connection point by virtue of being received in one of the fore-and-aft spaced holes to choose a particular pull point location.

10. The gang mower of claim 1, wherein each linkage connects each reel cutting unit to a cutting unit carrier frame provided on a lift arm of the gang mower, the lift arm being attached to the frame of the gang mower.

11. An improved reel gang mower of the type having a plurality of laterally spaced front reel cutting units having lateral gaps therebetween, each gap being covered by a rear reel cutting unit that spans the gap and that extends beyond opposite sides of a pair of adjacent front cutting units to also overlap by an overlap distance portions of the spaced front cutting units such that all the front and rear cutting units collectively cut an unbroken swath of grass during a single pass of the mower, each of the front and rear reel cutting units having front and rear rollers engaging the ground for independently supporting each reel cutting unit for rolling on the ground as the reel cutting units are cutting grass, wherein the improvement comprises:

(a) a first pivot linkage that connects the front reel cutting units to a frame of the reel gang mower for propelling the front reel cutting units in a forward and rearward direction as the frame of the reel gang mower moves forwardly and rearwardly, the first pivot linkage providing a first pull point on the front cutting units that establishes a first fore-and-aft weight distribution between the front and rear rollers as the front reel cutting units are cutting grass; and (b) a second pivot linkage that connects the rear reel cutting units to the frame of the reel gang mower for propelling the rear reel cutting units in a forward and rearward direction as the frame of the reel gang mower moves forwardly and rearwardly, the second pivot linkage providing a second pull point on the rear cutting units that establishes a second fore-and-aft weight distribution in which the front roller sees less weight and the rear roller sees more weight than they do in the front reel cutting units as the rear reel cutting units are cutting grass, whereby the lighter front roller weight on the rear reel cutting units helps eliminate or minimize marking in the overlap areas between the front and rear reel cutting units.

12. The gang mower of claim 11, wherein the first second pivot linkage of each rear reel cutting unit is selectively reconfigurable by a user into at least two different first and second orientations with the first orientation providing a pull point that is substantially the same as the pull points of the front cutting units and the second orientation providing the second pull point.

13. The gang mower of claim 12, wherein each reconfigurable second pivot linkage changes orientation depending upon where one end of the second pivot linkage is connected to either the frame of the reel gang mower or to the rear reel cutting units, a plurality of attachment holes being provided for the one end of the second pivot linkages with use of one hole providing the first orientation and use of a different hole providing the second orientation.

14. An improved reel gang mower having a frame, a plurality of reel cutting units carried on the frame in a gang configuration, each of the reel cutting units comprising a rotatable reel, a bedknife and front and rear rollers for supporting the reel cutting unit for rolling on the ground, a linkage for connecting each reel cutting unit for propulsion to the frame with the linkage establishing a pull point through which propulsive force from the frame is transmitted to the reel cutting unit for propelling the reel cutting unit, wherein the improvement comprises:

(a) the linkage of at least one reel cutting unit comprising a pair of fore-and-aft spaced, front and rear pivot links whose top ends are pivotally connected to the frame of the gang mower and whose bottom ends are pivotally connected to the at least one reel cutting unit, wherein the front and rear pivot links converge towards one another as the pivot links extend downwardly from the frame of the gang mower to the at least one reel cutting unit to form a virtual pull point at the intersection of axes along which the front and rear pivot links extend, and (b) a plurality of alternatively usable connection points for pivotally connecting at least one end of at least one pivot link to either the frame of the gang mower or to the at least one reel cutting unit to provide a plurality of alternatively usable and different virtual pull point locations for the at least one reel cutting unit, wherein the different virtual pull point locations are at different fore-and-aft locations relative to a center of gravity of the at least one reel to provide different fore-and-aft weight distributions between the front and rear rollers of the at least one reel cutting unit, and whereby a user can selectively vary the fore-and-aft weight distribution between the front and rear rollers of the at least one reel cutting unit to achieve different cutting results in different grass conditions by varying which of the alternatively usable connection points are being used to connect to the at least one end of the at least one pivot link.

15. The gang mower of claim 14, wherein the plurality of reel cutting units comprise at least one front reel cutting unit and at least one rear reel cutting unit that trails behind the front reel cutting unit in a fore-and-aft direction and that is at least partially staggered in a lateral direction relative to the front reel cutting unit such that a cutting swath cut by the rear reel cutting unit at least partially extends laterally beyond a cutting swath cut by the front reel cutting unit, and wherein the at least one reel cutting unit having the plurality of alternatively usable connection points comprises the rear reel cutting unit.

16. The gang mower of claim 15, wherein the plurality of alternatively usable connection points is provided in the frame of the gang mower with any one of the connection points being used at any one time for receiving the upper end of the rear pivot link.

* * * * *

UNITED STATES PATENT AND TRADEMARK OFFICE
CERTIFICATE OF CORRECTION

| | | |
|---|---|---|
| PATENT NO. | : 8,261,522 B2 | Page 1 of 1 |
| APPLICATION NO. | : 12/878851 | |
| DATED | : September 11, 2012 | |
| INVENTOR(S) | : Scott M. Coffin et al. | |

It is certified that error appears in the above-identified patent and that said Letters Patent is hereby corrected as shown below:

Col. 9, Line 37, delete "first".

Signed and Sealed this
Eleventh Day of December, 2012

David J. Kappos
*Director of the United States Patent and Trademark Office*